United States Patent [19]
Hartley

[11] Patent Number: 5,388,672
[45] Date of Patent: Feb. 14, 1995

[54] ANTI-ROLL-BACK DEVICE

[76] Inventor: Brian Hartley, Manor House, Mansfield Road, Winsick, Chesterfield, Derbyshire, United Kingdom, S41 0JG

[21] Appl. No.: 39,062

[22] PCT Filed: Oct. 4, 1991

[86] PCT No.: PCT/GB91/01723
§ 371 Date: Apr. 1, 1993
§ 102(e) Date: Apr. 1, 1993

[87] PCT Pub. No.: WO92/05983
PCT Pub. Date: Apr. 16, 1992

[30] Foreign Application Priority Data

| Oct. 9, 1990 | [GB] | United Kingdom | 9021872 |
| May 25, 1991 | [GB] | United Kingdom | 9111378 |
| Sep. 16, 1991 | [GB] | United Kingdom | 9119769 |

[51] Int. Cl.⁶ ............... F16D 59/00; B60T 1/00
[52] U.S. Cl. .................... 188/82.1; 188/30; 188/77 R; 188/79.56
[58] Field of Search ............... 188/30, 77 R, 77 W, 188/82.1, 82.3, 82.34, 82.6, 79.56; 192/1.31, 1.33, 8 C, 17 C

[56] References Cited

U.S. PATENT DOCUMENTS

| 1,396,754 | 11/1921 | Hosking | 188/77 R |
| 1,879,630 | 9/1932 | Moody | 188/30 |
| 4,715,483 | 12/1987 | Hobson et al. | 192/1.31 X |
| 4,867,282 | 9/1989 | Hartley | 188/77 R X |

FOREIGN PATENT DOCUMENTS

| 281241 | 9/1988 | European Pat. Off. |
| 921081 | 4/1947 | France . |
| 1600058 | 1/1970 | Germany . |
| 2129077 | 5/1984 | United Kingdom . |
| 2173558 | 10/1986 | United Kingdom . |

Primary Examiner—Robert J. Oberleitner
Assistant Examiner—Kevin D. Rutherford
Attorney, Agent, or Firm—Smith-Hill and Bedell

[57] ABSTRACT

A device (10) allows forward (clockwise) rotation of a shaft (12) but prevents reverse rotation unless disengaged. A loop (20) is attached at one end to a slide show (16), passes round a drum (14) on the shaft (12), around a first pin (24) and a second pin (26), to an arm (28). The arm (28) can move clockwise to slacken the loop (20) to disengage the device (10) and allow rotation of the shaft (12) in either sense. A mechanism for controlling the arm (12) and for self-tightening the loop (20) is described.

38 Claims, 5 Drawing Sheets

ANTI-ROLL-BACK DEVICE

The present invention relates to anti-roll-back devices for the selective prevention of reverse rotation of a rotatable member, and particularly but not exclusively for a device for use in vehicles.

When a vehicle is on an inclined road and facing uphill, the handbrake may not hold the vehicle against rolling back, particularly if the vehicle is heavy or heavily laden. Furthermore, when the vehicle is only temporarily brought to a halt, many drivers do not apply the handbrake but hold the car against rolling back by partially engaging the clutch to a degree sufficient to hold the vehicle stationary. This causes unnecessary wear of the clutch plates.

One proposal to overcome this problem uses a loop or noose which extends from an anchor point around a rotatable member such as the vehicle drive shaft, to a further anchor point. The arrangement is such that when the drive shaft is rotating in the forward direction of the vehicle, the loop or noose remains slack around the shaft, but as soon as the shaft attempts to rotate in the reverse direction, the loop or noose tightens on the shaft to prevent that reverse rotation. In order to enable reverse rotation when that is required, an arrangement is provided which is selectively activatable to prevent the loop or noose tightening on the shaft during reverse rotation. Conveniently, the arrangement is activated when reverse gear is selected.

The present invention seeks to provide an improved device of the type described above.

According to one aspect of the invention, there is provided an anti-roll-back device for a rotatable member, comprising a second member located adjacent the rotatable member, a loop or noose secured at one end to the second member and extending around the rotatable member to pass around a guide member secured to the second member, the loop or noose then extending to a movable member, and there being releasable locking means operable to hold the movable member against movement and to release the movable member to move as and when required.

The movable member may be a pivotal member. The pivotal member may be mounted on a pivot located in fixed spaced relationship to the rotatable member.

The loop or noose may be anchored to the pivotal member.

Preferably the locking means incorporate bias means operable to provide a bias force to cause or assist in movement of the movable member. The bias means may comprise a resilient member.

The locking means may comprise a remotely controllable actuator, such as a solenoid. The actuator preferably controls a latch means operable to prevent the movable member moving.

The movable member may be coupled to the locking means by at least one intermediate member. Preferably the latch means acts directly on the or one of the intermediate members. The movable member may be directly coupled to a first intermediate member to cause the first intermediate member to move as the movable member moves. The first intermediate member may comprise first and second levers mounted on a common spindle, the movable member being coupled to the first lever and the locking means being coupled to the second lever. The coupling between the movable member and the first intermediate member may comprise a pin in the lever or member, and a slot or recess in the member or lever, respectively. Preferably the first intermediate member is directly coupled to a second intermediate member. The coupling may be by means of a pin slidable in a slot or recess. The locking means is preferably coupled directly to the second intermediate member. The second intermediate member may be pivotally mounted. The locking means may comprise a latch bar movable into and out of engagement with a corresponding formation on the second intermediate member.

The device may comprise manually operable means for releasing the locking means. The manually operable means may comprise a control member operable to move the latch bar. The control member may comprise a Bowden cable.

Preferably, when the locking means is engaged, the movable member is held in a position such that the rotatable member Can freely rotate in one (forward) direction, but immediately the rotatable member attempts to rotate in the opposite (reverse) direction, a force is applied through the loop or noose to urge the second member in a direction to cause the loop or noose to tighten on the rotatable member and prevent opposite (reverse) rotation.

Preferably, when the locking means is disengaged, a force applied to the loop or noose by rotation of the rotatable member in the reverse direction provides a force on the loop or noose to cause the movable member to move to slacken the loop or noose. Preferably the loop or noose is maintained in a slack condition until a first (forward) rotation of the rotatable member recommences.

The apparatus may further comprise second bias means operable to bias the second member to lightly tighten the loop or noose around the rotatable member.

The loop or noose may pass around a further guide member between the guide member secured to the second member and the pivotal member, the further guide member being fixed in relation to the rotatable member.

The device may further comprise a wear member carried by the slidable member to bear on the rotatable member and maintain a minimum spacing between the second member and the rotatable member.

A difficulty with this type of device may arise as a consequence of the heavy loads transmitted to the loop or noose when holding the shaft against rotation, especially if the vehicle is on a steep hill or is heavy. There is a tendency for the loop or noose to stretch in use. This seriously impairs the action of the loop or noose, reducing the effectiveness of the device in preventing the vehicle from rolling back.

According to a second aspect of the invention there is provided an anti-roll-back device, comprising a loop or noose which extends, in use, from an anchor location, around a rotatable member to another anchor location, and further comprising control means selectively activatable to put the loop or noose in a first or second operative condition wherein, in the first operative condition, the rotatable member can rotate in a first forward direction, the loop or noose tightening on the rotatable member as it attempts to rotate in a second reverse direction to prevent rotation in the reverse direction, and wherein in the second operative condition the loop or noose allows the rotatable member to rotate in the reverse direction, the device further comprising an anchor arrangement located at one of the anchor locations and operable independently of the operation of the control means to take up slack in the loop or noose, arising from stretching of the material thereof, the anchor arrangement being lockable to prevent the loop or noose from slackening.

Preferably the anchor arrangement comprises a rotatable anchor member to which the loop or noose is secured, whereby rotation of the anchor member causes part of the loop or noose to be wound on to the anchor member to take up slack. The rotatable anchor member is preferably a pin member. The apparatus may further comprise a resilient member which provides a force tending to cause the anchor arrangement to operate to take up slack, whereby any slack which occurs will automatically be taken up. The resilience of the resilient member is preferably sufficient to cause the loop or noose to be tightened into light contact with the rotatable member. The resilient member may provide a force to a pivotally mounted lever forming part of the anchor arrangement, thereby tending to cause the lever to pivot to operate the anchor arrangement.

Preferably the operation of the anchor arrangement causes rotation of a ratchet, and the arrangement further comprising a pawl which, in use, cooperates with the ratchet to prevent the loop or noose from slackening.

The anchor arrangement may be adapted to allow manual operation to take up slack.

Preferably the device further comprises a second member slidably mounted in close proximity to the rotatable member, the loop or noose being anchored to the slidable member and extending around the rotatable member, around a guide member attached to the slidable member, and to a second anchor location.

Preferably the anchor arrangement is mounted on the slidable member to anchor the loop or noose thereto.

The invention also provides an anti-roll-back device according to the second aspect of the invention, and incorporating any or all of the features of the first aspect of the invention.

Examples of anti-roll-back devices according to the present invention will now be described in more detail, by way of example only, and with reference to the accompanying drawings in which:

FIG. 1 is a front elevation of a first device when engaged to prevent reverse rotation;

FIG. 2 corresponds to FIG. 1, but shows the device when disengaged;

Figure 1:
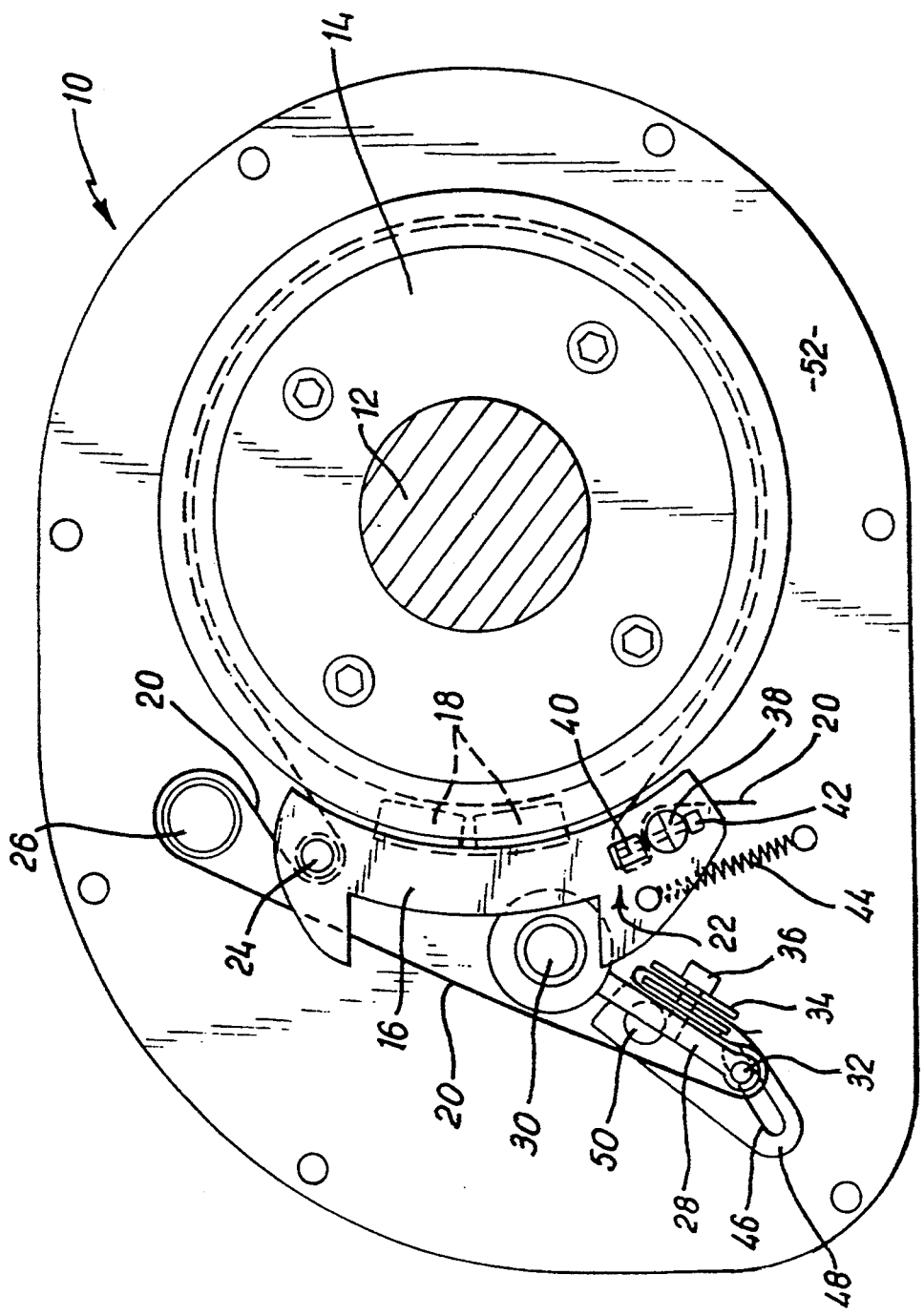

Turning to FIG. 1, there is shown a device 10 operable, when engaged, to allow forward rotation of a rotatable member or shaft 12 but to prevent reverse rotation of the shaft 12.

The device 10 Comprises a drum 14 mounted to rotate with the shaft 12. A second member or slide shoe 16 is located close to the drum 14, but maintained at a minimum distance from the drum by phosphor bronze wear pads 18 which are mounted on the slide shoe 16, and bear lightly on the outer surface of the drum 14 attached to the shaft 12.

A loop or noose 20 (hereafter referred to simply as a loop) is attached at one end to the slide shoe 16 by means of an attachment arrangement indicated generally at 22. The loop 20 passes around the drum 14, under a pin 24 rotatably mounted on the slide shoe 16, over a rotatable pin 26 which is fixed relative to the shaft 12, and to a pivotal arm 28. The rotatable pins 24,26 could alternatively be replaced by fixed pins carrying rotatable collars.

The arm 28 is pivotally mounted at an axis 30. The loop 20 passes around the free end 32 of the arm 28 and is anchored to the arm 28 by means of washers 34 and a screw 36.

The attachment arrangement 22 consists of a post 38, a bar 40, and at least one screw 42 which holds the bar 40 against the post 38. The free end of the loop 20 passes between the bar 40 and post 38. The post 38 is mounted on the slide shoe 16. Consequently, by tightening the screws 42, the free end of the loop 20 is firmly secured to the slide shoe 16.

A light spring 44 is attached at one end to the slide shoe 16 and at its other end, to a fixed position. The spring 44 lightly pulls on the slide shoe 16. This biasses the pin 24 away from the pin 26 which in turn increases the path length of the loop 20 from the arm 28 to the attachment arrangement 22 and consequently maintains the loop 20 in light contact with the drum 14.

When the device 10 is in the condition shown in FIG. 1, any forward rotation of the shaft 12 (in the clockwise direction) creates a frictional force between the loop 20 and the drum 14. The direction of this force is to move the slide shoe 16 up (in the FIG. 1 orientation). This causes the pin 24 to approach the pin 26 and reduce the overall path length of the loop 20, so that the loop slackens and does not interfere with the forward rotation. However, if the shaft 12 begins to rotate in reverse (anti-clockwise) the friction on the loop pulls the slide shoe 16 in the opposite direction. The pin 24 moves away from the pin 26 and the loop 20 tightens around the drum 14. The tighter the loop 20 becomes, the greater is the frictional force pulling the pin 24 away from the pin 26 and consequently, the shaft 12 is tightly held against reverse rotation. To assist this, the loop 20 may be a belt of high friction material. Furthermore, although the shoe 16 is located between the arm 28 and the drum 14, it is otherwise unrestricted in its movement. The shoe will tend to slide on the drum between the two positions shown in the drawings, but this freedom allows the shoe to move to other positions, reducing the risk of jamming. The term "slide shoe" is therefore not intended to imply that the shoe can only move by sliding.

Figure 3:
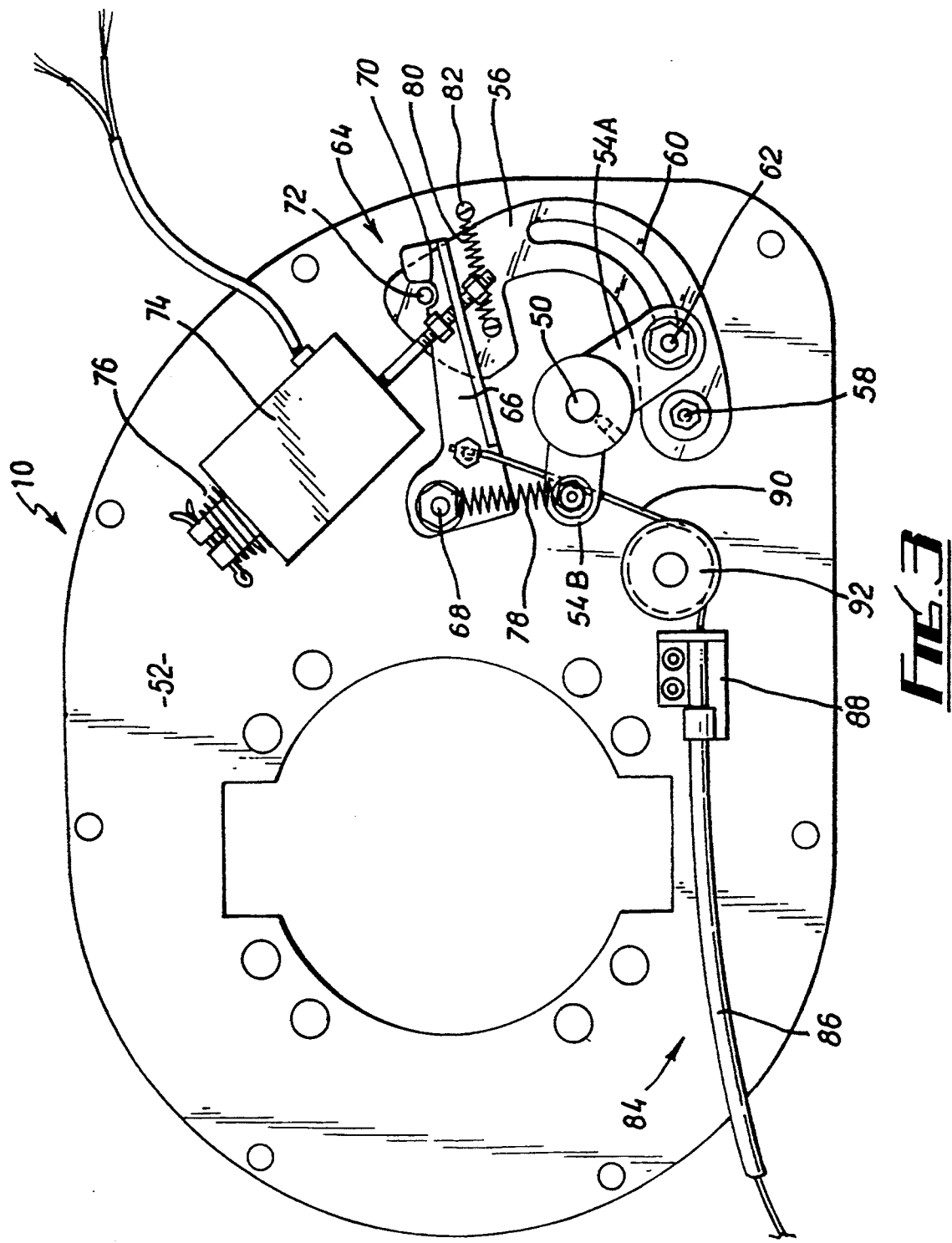
FIG. 3 is a rear elevation corresponding to FIG. 1, with the rotatable member removed, for clarity.
Figure 4:
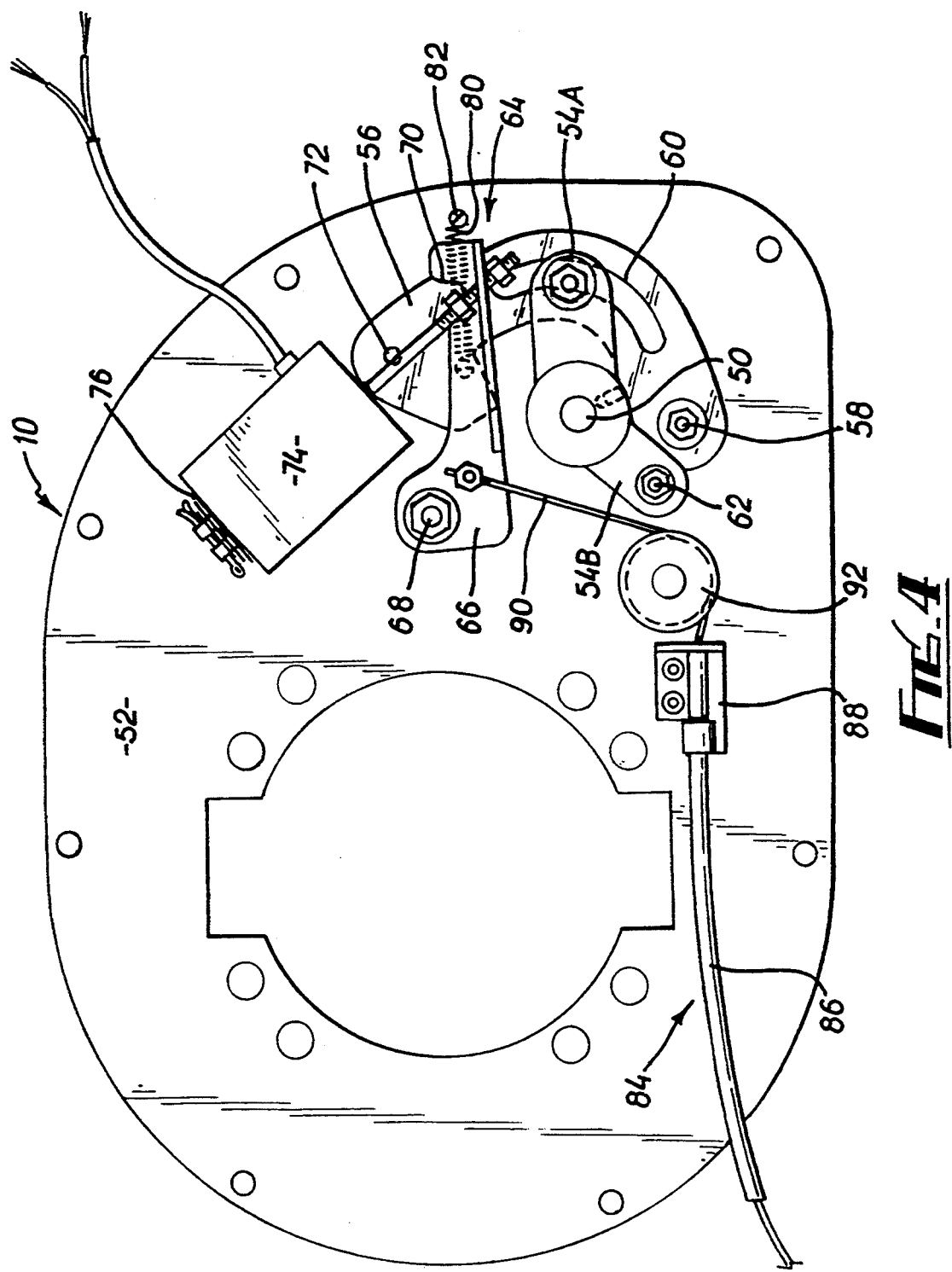
FIG. 4 is a rear elevation corresponding to FIG. 2, with the rotatable member removed, for clarity.

In some applications, reverse rotation will sometimes be required. For instance, when the device is installed in a vehicle, the device can prevent the vehicle rolling downhill (when facing uphill) but the vehicle will occasionally need to be reversed. It is therefore necessary to be able to disengage the device. The FIGS. 3 and 4 show a control mechanism for the device. The control mechanism operates to control pivotting of the arm 28 between the positions shown in FIGS. 1 and 2. The shaft 12 and drum 14 are omitted from FIGS. 3 and 4, in the interests of clarity.

Figure 2:
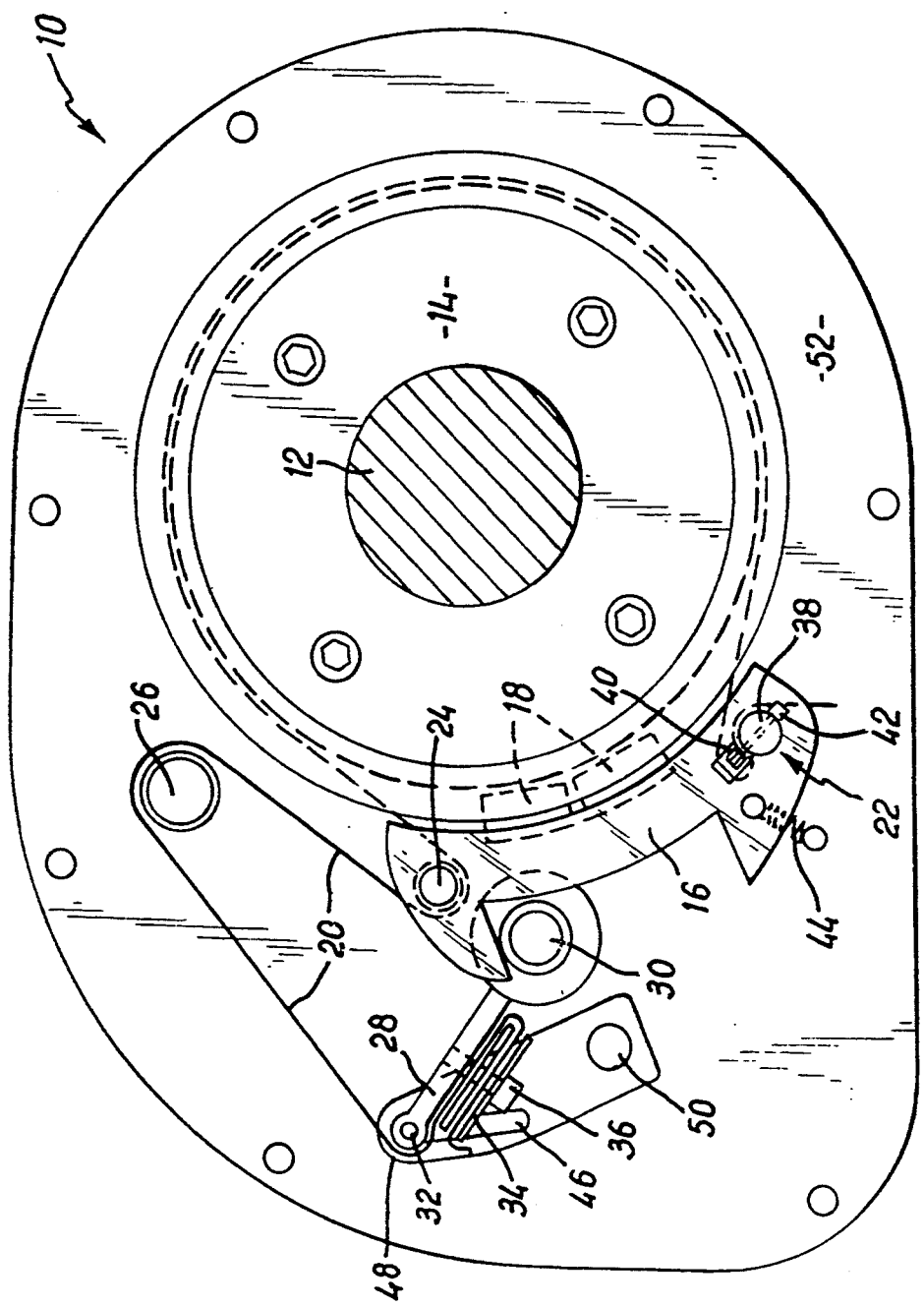

The arm 28 is pivotal from the engaged position shown in FIG. 1 to the disengaged position shown in FIG. 2, as has been described; The free end 32 carries a pin which runs in a slot 46 in a first lever 48 of an intermediate member which is pivotally mounted at 50. As the arm 28 moves from the engaged position to the disengaged position, the pin at the free end 32 moves from one end of the slot 46 to the other end, and the lever 48 pivots about the axis at 50.

The pivotal mounting of the lever 48 is by means of a spindle 50 which passes through the base plate 52 of the device 10, through to the rear where the spindle 50 carries a second lever 54 having lever arms 54A and 54B.

A second intermediate-member 56 is pivotally mounted at 58 at the rear of the base plate 52. A curved slot 60 is provided along the member 56 and engages a pin (at 62) carried on the second lever arm 54A. In consequence, the second lever 54 cannot pivot unless the second intermediate member 56 is free to pivot. If the second lever 54 is not free to pivot, the first lever 48 is not free to pivot. If the first lever 48 is not free to pivot, the arm 28 is not free to pivot. If the arm 28 is not free to pivot, the loop 20 cannot slacken and the device is held in the engaged position.

The second intermediate member 56 is normally held against movement by means of a latch arrangement at 64. This consists of a latch arm 66 pivotally mounted at 68 and having a notch 70 which can engage a pin 72 carried on the second intermediate member 56, or can release the pin 72 by pivotting about the axis 68. The position of the latch arm 66 and hence the engagement or disengagement of the notch 70 and pin 72 is controlled by a solenoid actuator 74. The solenoid 74 has a return spring 76 which normally holds the latch arm 66 in the position shown in FIG. 3, in which the notch 70 is engaging the pin 72 to prevent movement of the second intermediate member 56. As described above, this locks the device 10 in the engaged condition.

If reverse rotation of the shaft 12 is required, current is supplied to the solenoid 74 to push the latch arm 66 to the position shown in FIG. 4, releasing the pin 72 from the notch 70. The intermediate member 56 is now free to pivot and this movement will occur in the following circumstances. With the latch disengaged, if the shaft 12 begins to rotate in the reverse direction, the loop 20 pulls on the arm 28, urging it to the disengaged position shown in FIG. 2. In moving to the disengaged position, the arm 28 pulls the first lever 48 and thus the second lever 54 pivots to the position shown in FIG. 4. In order for the second lever 54 to move to this position, the second intermediate member 56 also pivots, again to the position shown in FIG. 4.

This pivotal motion of the second lever arm 54 and second intermediate member 56 is resisted by return spring 78 (shown in FIG. 3 but not in FIG. 4), between the second lever arm 54b and the pivot of the latch arm 66, and a spring 80 between the second intermediate member 56 and a fixed point 82. The action of these springs is to urge the various members back to the positions shown in FIG. 3, but while the shaft 12 is in reverse rotation, the forces through the loop 20 override the springs 78,80 to maintain the members in the position shown in FIG. 4.

The solenoid 74 will normally be activated by a switch associated with a gear lever, so that when reverse gear is selected, the locking mechanism is released to allow the device to disengage. Consequently, when reverse gear is deselected, the solenoid 74 returns the latch arm 66 to the original position (FIG. 3) by action of the spring 76. However, the members 54,56 will still be in the positions shown in FIG. 4 and the pin 72 will be out of the notch 70. This condition will continue while reverse rotation of the shaft 12 continues (reverse rotation may continue after reverse gear is disengaged). As soon as forward rotation again occurs, the loop 20 will tend to slacken around the drum 14, as described above. This slackness allows the springs 78, 80 to return the members 54,56 to the positions shown in FIG. 3, and in so doing, the pin 72 re-enters the notch 76 to lock the device once again in the engaged condition.

In case it is necessary to manually override the device 10, a Bowden cable 84 is provided. The sleeve 86 is attached to the base plate 52 at 88. The cable 90 of the Bowden cable 84 passes round a drum 92 to the latch arm 66 to which it is secured. Consequently, by operation of the Bowden cable 84, the latch arm 66 can be pulled to disengage the pin 72. Manual override may be required if, for instance, the solenoid fails, or during routine maintenance.

Various modifications can be made to the apparatus described above, without departing from the scope of the present invention. In particular, various different actuator and locking arrangements could be used and other arrangements could be devised for coupling the locking means to the pivotal arm 28. The geometry off the loop 20 could be varied, with consequent changes to the location of guide pins and the shape of the slide shoe 16.

The remaining FIGURES show a modified version of the device 10 shown in FIGS. 1 to 4. The anti-rollback device 110 is again of the form in which a loop or noose 112 (hereafter referred to simply as a loop) extends from an anchor location at 114 around a guide member 116 in the form of a pin, around a second guide member 118 in the form of a second pin and then around a drum 120 on the drive shaft 122 to a second anchor location at 124. The anchor arrangement at 124, and the pin 118 are both mounted on a second member 126 (referred to as a slide shoe). The slide shoe 126 can slide up and down (in the orientation shown in FIG. 5). If the shaft 122 rotates in the forward direction (clockwise) friction between the drum 120 and the loop 112 causes the slide shoe 126 to rise. This in turn slackens the loop 112 to reduce any frictional engagement between the loop 112 and the drum 120, thereby allowing free forward rotation. If the shaft 122 begins to rotate in the reverse direction (anti-clockwise) frictional engagement between the drum 120 and the loop 112 pulls the slide shoe 126 down. This causes the pin 118 to move away from the pin 116, thereby increasing the overall path length of the loop 112 from the anchor point 114 to the anchor arrangement at 124. This causes the loop 112 to tighten on the drum 120 to prevent further reverse rotation. The movement of the shoe 126 is described as "sliding", but it can be seen from FIG. 5 that the movement is principally determined by the forces applied by the loop 112 to the anchor point 124 and pin 118. This reduces the risk of jamming.

In order to allow the device 110 to be overriden, the anchor location 114 is on a rotatable arm 128 which corresponds to the arm 28 of FIGS. 1 to 4, and can pivot about an axis at 130 in a clockwise direction, to slacken the loop 112 sufficiently to avoid the loop 112 engaging and preventing rotation of the drum 120.

Figure 5:
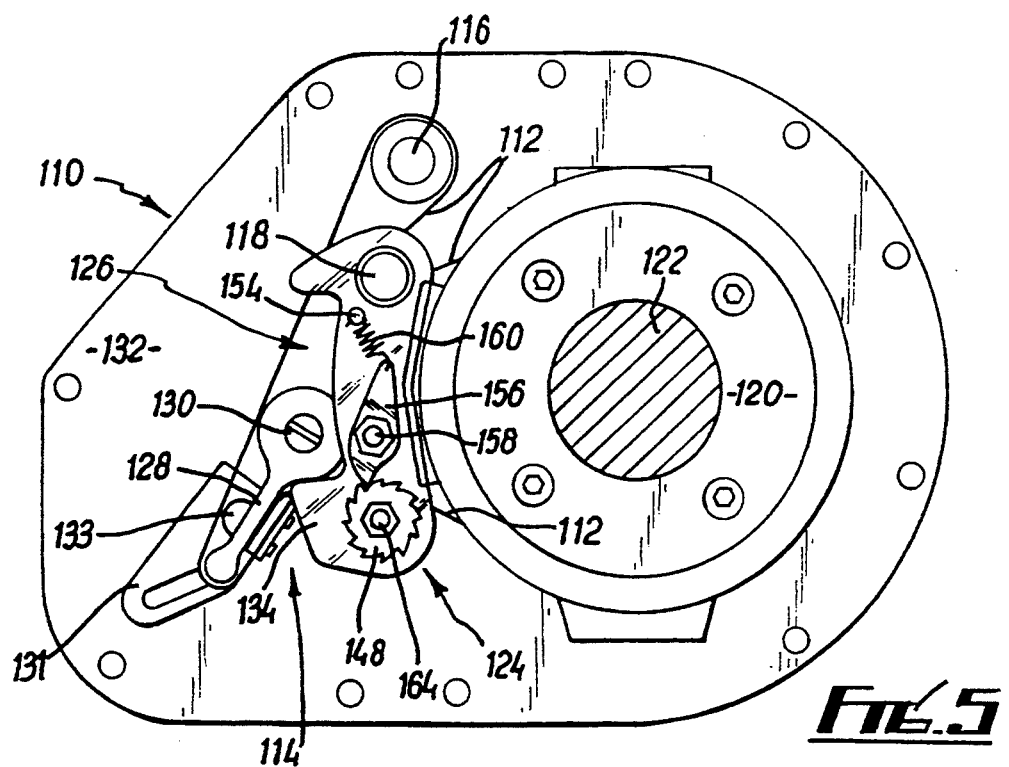
FIG. 5 is a front elevation corresponding to FIG. 1, showing a second anti-roll-back device which embodies the present invention.

The arrangement so far described in relation to FIG. 5 corresponds closely to the arrangement described in relation to FIGS. 1 to 4. The position of the arm 128 is controlled by a control mechanism which is not wholly visible in FIG. 5, being mainly located behind the plate 132. The control mechanism controls the arm 128 by means of a rotatable shaft 133 extending through the plate 132, and carrying a lever 131 corresponding to the lever 48 of FIG. 1. Other details of the control mechanism may be the same as those described above in relation to FIGS. 1 to 4, or alternative control mechanisms could be used.

Figure 7:
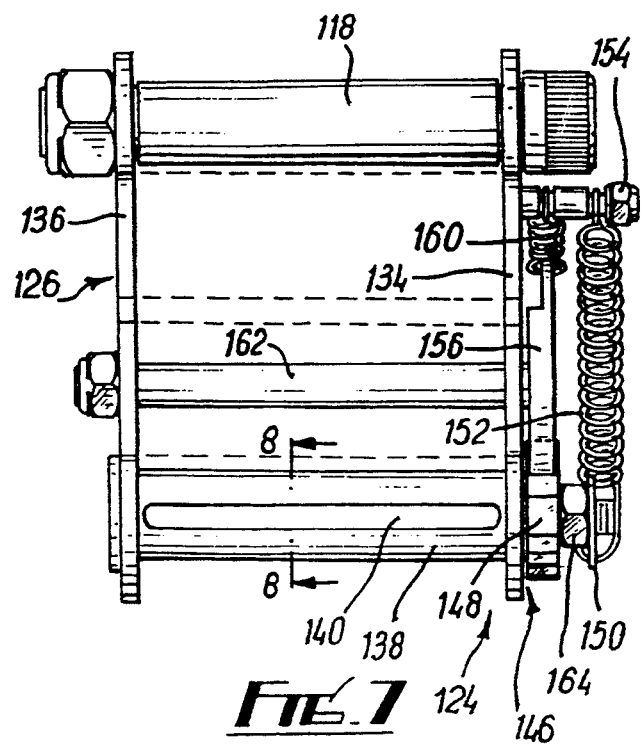
FIG. 7 is a side view of the slidable member of FIG. 6.
Figure 8:
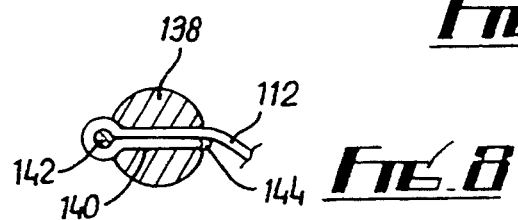
FIG. 8 is a partial section of FIG. 7, along the lines 8—8.

The slide shoe 126 and the anchor arrangement at 124 can be described in more detail with reference to FIGS. 6, 7 and 8. The slide shoe 126 has a front plate 134 and a rear plate 136. The pin 118 extends between the plates 134,136 and is either rotatably mounted thereon, or carries a rotatable sleeve. The pin 118 is near the upper end of the shoe 126.

The anchor arrangement 124 is near the lower end of the shoe 126. The anchor arrangement comprises a pin 138 which is rotatably mounted on the plates 134,136 and has a diametric slot 140 extending substantially the whole length of the pin 138 between the plates 134,136. One end of the loop 112 is secured to the pin 138 by passing it through the slot 140, doubling it back around a securing pin 142 (FIG. 8) and passing the free end 144 back through the slot 140. Any rotation of the pin 138 will cause the loop 112 to wind onto or off the pin 138.

An extension 146 of the pin 138 passes through the front plate 134 and carries a ratchet 148 and a lever 150. The free end of the lever 150 is attached to one end of an extension spring 152, the other end of which is attached to a post 154 mounted on the front plate 134. The lever 150 and spring 152 are not shown in FIG. 5, in the interests of clarity.

Figure 6:
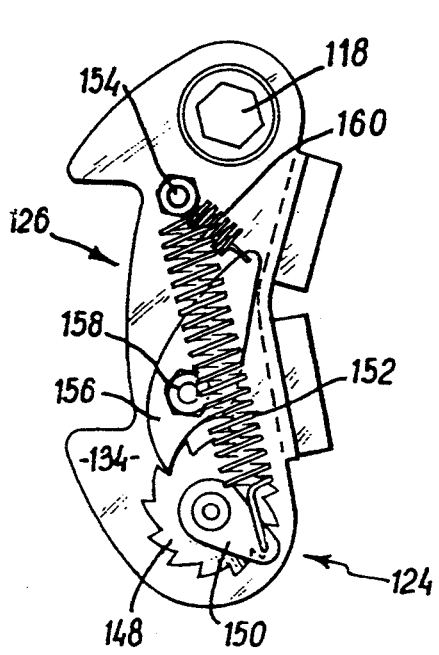
FIG. 6 is an elevation view of the slidable member shown in FIG. 5, to an enlarged scale.

The spring 152 is normally under tension, as can be seen from FIG. 6, and this applies a force to the lever 130 tending to rotate the lever and hence the pin 138 in the anti-clockwise direction (FIG. 6). Reverse rotation of the ratchet 148, in the clockwise direction, is prevented by a pawl 156 which is rotatably mounted at 158 and urged against the ratchet 148 by the action of a second extension spring 160 acting between the pawl 156 and the post 154. The rotatable mounting of the pawl 156 is provided by a further pin 162 which extends between the plates 136 and through the front plate 134 to carry the pawl 156 at one end.

In order to set up the device 110 for use, the pin 138 is turned to wind the loop 112 on to the pin 138 until the loop 112 is in light contact with the periphery of the drum 120, but not in sufficiently tight contact to prevent forward rotation of the shaft 122. The spring 152 applies a force to the pin 138 through the lever 150, to maintain this light contact. The device 110 can then be used normally, as described above, to allow forward rotation and prevent reverse rotation of the shaft 122, or to be disengaged by pivotal movement of the arm 128, to allow reverse rotation.

Initial setting up of the device is facilitated by a nut 164 adjacent the ratchet 148. The nut 164 allows the ratchet 148 and pin 138 to be rotated manually, for instance by means of a spanner.

If the loop 112 stretches, as a result of the large forces applied to it during use, the loop 112 would become slack. This slackness allows the spring 152 to pull the lever 150 towards the post 154, thereby rotating the pin 138 to coil more of the loop 112 on to the pin 138, so taking up the slack caused by the stretching. Consequently, the slackness is automatically taken up to maintain the loop 112 in the adequately tight condition. Reverse rotation of the pin 138, so as to slacken the loop 112, is prevented by the locking action of the pawl 156.

Variations and modifications can be made to the apparatus described above in relation to FIGS. 5 to 8, without departing from the scope of the present invention. It is possible to envisage the self-tightening arrangement of the anchor location at 124 being incorporated alternatively in the anchor location at 114. Other arrangements could be used to take up slack. Other spring arrangements could be adopted, and locking means alternative to the ratchet and pawl arrangement could be used.

It has been found that it may be advantageous when fitting a new or replacement loop to lightly roughen or serrate the part of the drum which contacts the loop. This allows better grip for the new loop until it has time to "bed in".

The terms "upper" "lower" etc. have been used above in accordance with the orientation of the device shown in the drawings, but it is to be understood that the device could be used with other orientations.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An anti-roll-back device for a rotatable member, comprising a second member located adjacent the rotatable member, a loop or noose secured at one end to the second member and extending around the rotatable member to pass around a guide member secured to the second member, the loop or noose then extending to a movable member, the second member being substantially unrestricted in its movements in response to forces applied to it, during use, by said loop or noose, and there being releasable locking means operable to hold the movable member against movement and to release the movable member to move as and when required.

2. A device according to claim 1, wherein the movable member is coupled to the locking means by at least one intermediate member.

3. A device according to claim 2, wherein the movable member is directly coupled to a first intermediate member to cause the first intermediate member to move as the movable member moves.

4. A device according to claim 3, wherein the first intermediate member comprises first and second levers mounted on a common spindle, the movable member being coupled to the first lever and the locking means being coupled to the second lever.

5. A device according to claim 4, wherein the coupling between the movable member and the first intermediate member comprises a pin and one of a slot and a recess.

6. A device according to claim 3, wherein the first intermediate member is directly coupled to a second intermediate member.

7. A device according to claim 6, wherein the coupling is by means of a pin slidable in a slot or recess.

8. A device according to claim 6, wherein the locking means is coupled directly to the second intermediate member.

9. A device according to claim 6, wherein the second intermediate member is pivotally mounted.

10. A device according to claim 6, wherein the locking means comprises a latch bar movable into and out of engagement with a corresponding formation on the second intermediate member.

11. A device according to claim 2, wherein the latch means acts directly on the or one of the intermediate members.

12. A device according to claim 1, further comprising manually operable means for releasing the locking means.

13. A device according to claim 12, wherein the manually operable means comprise a control member operable to move the latch bar.

14. A device according to claim 13, wherein the control member comprises a Bowden cable.

15. A device according to claim 1, wherein the movable member is a pivotal member.

16. A device according to claim 15, wherein the pivotal member is mounted on a pivot located in fixed spaced relationship to the rotatable member.

17. A device according to claim 15, wherein the loop or noose is anchored to the pivotal member.

18. A device according to claim 1, wherein the locking means incorporate bias means operable to provide a bias force to cause or assist in movement of the movable member.

19. A device according to claim 18, wherein the bias means comprise a resilient member.

20. A device according to claim 1, wherein the locking means comprise a remotely controllable actuator.

21. A device according to claim 20, wherein the actuator is a solenoid.

22. A device according to claim 20, wherein the actuator controls a latch means operable to prevent the movable member moving.

23. A device according to claim 1, wherein, when the locking means is disengaged, a force applied to the loop or noose by rotation of the rotatable member in the reverse direction provides a force on the loop or noose to cause the movable member to move to slacken the loop or noose.

24. A device according to claim 23, wherein the loop or noose is maintained in a slack condition until a first rotation of the rotatable member recommences.

25. A device according to claim 1, wherein, when the locking means is engaged, the movable member is held in a position such that the rotatable member can freely rotate in one direction, but as soon as the rotatable member attempts to rotate in the opposite direction, a force is applied through the loop or noose to urge the second member in a direction to cause the loop or noose to tighten on the rotatable member and prevent opposite rotation.

26. A device according to claim 1, and further comprising second bias means operable to bias the second member to lightly tighten the loop or noose around the rotatable member.

27. A device according to claim 1, wherein the loop or noose passes around a further guide member between the guide member secured to the second member and the pivotal member, the further guide member being fixed in relation to the rotatable member.

28. A device according to claim 1, wherein a wear member is carried by the movable member to bear on the rotatable member and maintain a minimum spacing between the second member and the rotatable member.

29. An anti-roll-back device, comprising a loop or noose which extends, in use, from an anchor location, around a rotatable member to another anchor location, and further comprising control means selectively activatable to put the loop or noose in a first or second operative condition wherein, in the first operative condition, the rotatable member can rotate in a first forward direction, the loop or noose tightening on the rotatable member as it attempts to rotate in a second reverse direction to prevent rotation in the reverse direction, and wherein in the second operative condition the loop or noose allows the rotatable member to rotate in the reverse direction, the device further comprising an anchor arrangement located at one of the anchor locations and operable independently of the operation of the control means to take up slack in the loop or noose arising from stretching of the material thereof, the anchor arrangement being lockable to prevent the loop or noose from slackening.

30. A device according to claim 29, wherein the anchor arrangement comprises a rotatable anchor member to which the loop or noose is secured, whereby rotation of the anchor member causes part of the loop or noose to be wound on to the anchor member to take up slack.

31. A device according to claim 30, wherein the rotatable anchor member is a pin member.

32. A device according to claim 29, further comprising a resilient member Which provides a force tending to cause the anchor arrangement to operate to take up slack, whereby any slack which occurs will automatically be taken up.

33. A device according to claim 32, wherein the resilience of the resilient member is sufficient to cause the loop or noose to be tightened into light contact with the rotatable member.

34. A device according to claim 32, wherein the resilient member provides a force to a pivotally mounted lever forming part of the anchor arrangement, thereby tending to cause the lever to pivot to operate the anchor arrangement.

35. A device according to claim 29, wherein the operation of the anchor arrangement causes rotation of a ratchet, and the arrangement further comprising a pawl which, in use, cooperates with the ratchet to prevent the loop or noose from slackening.

36. A device according to claim 29, wherein the anchor arrangement is adapted to allow manual operation to take up slack.

37. A device according to claim 29, wherein the device further comprises a slidable member slidably mounted in close proximity to the rotatable member, the loop or noose being anchored to the slidable member and extending around the rotatable member, around a guide member attached to the slidable member, and to a second anchor location.

38. A device according to claim 37, wherein the anchor arrangement is mounted on the slidable member to anchor the loop or noose thereto.

* * * * *